(12) United States Patent
Snoddy et al.

(10) Patent No.: US 9,865,004 B1
(45) Date of Patent: Jan. 9, 2018

(54) SYSTEM AND METHOD FOR ADVERTISEMENT IMPRESSION VOLUME ESTIMATION

(71) Applicant: MaxPoint Interactive, Inc., Morrisville, NC (US)

(72) Inventors: Laura Snoddy, Raleigh, NC (US); Michael Els, Durham, NC (US)

(73) Assignee: MaxPoint Interactive, Inc., Morrisville, NC (US)

( * ) Notice: Subject to any disclaimer, the term of this patent is extended or adjusted under 35 U.S.C. 154(b) by 254 days.

(21) Appl. No.: 14/139,567

(22) Filed: Dec. 23, 2013

(51) Int. Cl.
*G06Q 30/02* (2012.01)

(52) U.S. Cl.
CPC ................. *G06Q 30/0244* (2013.01)

(58) Field of Classification Search
CPC .................................. G06C 30/0244
USPC ........................... 705/14.43, 14.41
See application file for complete search history.

(56) References Cited

U.S. PATENT DOCUMENTS

| | | | |
|---|---|---|---|
| 2005/0187818 A1* | 8/2005 | Zito | G06Q 30/02 705/14.52 |
| 2006/0026061 A1* | 2/2006 | Collins | G06Q 30/02 705/14.43 |
| 2009/0099904 A1* | 4/2009 | Affeld | G06Q 30/02 705/14.43 |
| 2010/0106606 A1* | 4/2010 | Filice et al. | 705/14.73 |
| 2011/0035276 A1* | 2/2011 | Ghosh | G06Q 30/02 705/14.46 |

* cited by examiner

*Primary Examiner* — David Stoltenberg
*Assistant Examiner* — Robert C Johnson
(74) *Attorney, Agent, or Firm* — Slayden Grubert Beard PLLC

(57) ABSTRACT

A system and method for advertisement impression volume estimation is herein disclosed. According to one embodiment, the computer-implemented method includes identifying a plurality of advertisement placements for an advertisement campaign based on a campaign parameter and a specified performance level for a past advertisement campaign, determining a first plurality of advertisement impressions from the plurality of advertisement placements based on a target geographic region, and estimating a second plurality of advertisement impressions from the first plurality of advertisement impressions based on a discount rate.

16 Claims, 4 Drawing Sheets

SYSTEM AND METHOD FOR ADVERTISEMENT IMPRESSION VOLUME ESTIMATION

FIELD

The present disclosure relates in general to the field of computer software and systems. In particular, the present disclosure relates to a system and method for estimating an advertisement impression volume for an advertising campaign.

BACKGROUND

An online advertisement placement generally refers to a specific advertisement slot on a web page. A collection of multiple advertisement placements is typically referred to as inventory. Advertisement placements are increasingly being filled through a real-time bidding (RTB) exchange, such as ADX®, ADMELD®, PUBMATIC®, and RUBICON PROJECT®. An advertisement placement becomes available when a user/Internet surfer visits a web page where a publisher is selling the advertisement placement on an RTB exchange. The RTB exchange provides a bid request that represents the advertisement placement. A bidding server that has computer hardware linked to the RTB exchange, receives the bid request and responds with either a bid or a decline within a short period of time (e.g., around 50-100 ms or less). If the bidding server wins the bid, the bidding server purchases an advertisement impression, i.e., an instance of an advertisement appearing on the web page.

SUMMARY

A system and method for advertisement impression volume estimation is herein disclosed. According to one embodiment, the computer-implemented method includes identifying a plurality of advertisement placements for an advertisement campaign based on a campaign parameter and a specified performance level for a past advertisement campaign, determining a first plurality of advertisement impressions from the plurality of advertisement placements based on a target geographic region, and estimating a second plurality of advertisement impressions from the first plurality of advertisement impressions based on a discount rate.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

Figure 1:
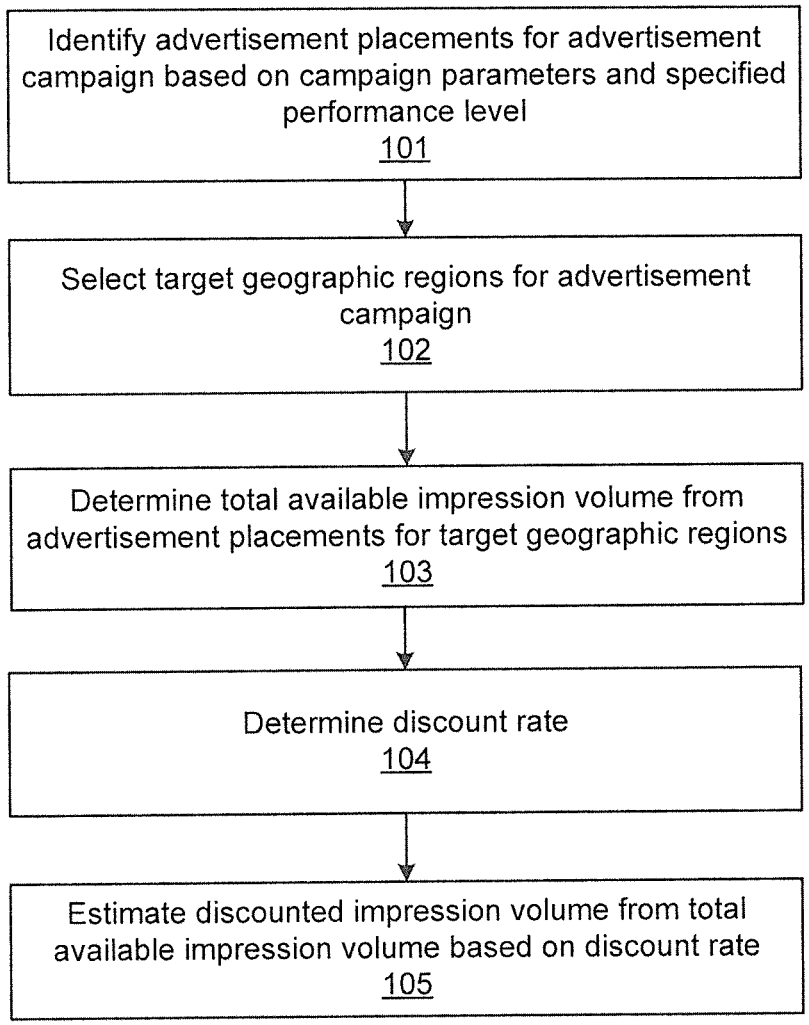
FIG. 1 illustrates a flowchart of an exemplary process for estimating an advertisement impression volume for an advertisement campaign, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A system and method for advertisement impression volume estimation is herein disclosed. According to one embodiment, the computer-implemented method includes identifying a plurality of advertisement placements for an advertisement campaign based on a campaign parameter and a specified performance level for a past advertisement campaign, determining a first plurality of advertisement impressions that from the plurality of advertisement placements based on a target geographic region, and estimating a second plurality of advertisement impressions from the first plurality of advertisement impressions based on a discount rate.

Each of the features and teachings disclosed herein can be utilized separately or in conjunction with other features and teachings to provide a system and method for combining past user events with real-time user events to rapidly respond to advertising opportunities. Representative examples utilizing many of these additional features and teachings, both separately and in combination are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. The steps are not intended to be performed in a specific sequential manner unless specifically designated as such.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps. The structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure. It is also expressly noted that the dimensions and the shapes of the components shown in the figures are designed to help to understand how the present teachings are practiced, but not intended to limit the dimensions and the shapes shown in the examples.

According to one embodiment, the present system identifies one or more target geographic regions to serve advertisement impressions. The present system categorizes users that are accessing a webpage into various geographic regions based on offline and online data. According to one embodiment, offline data includes, but is not limited to, location information and a reference to the location information. The present system uses the location information from the offline data to map to one or more geographic regions. Examples of offline data include, but are not limited to, demographic data, point of sale data, and business information data. According to another embodiment, online data includes, but is not limited to, online activity data associated with an IP address. The present system uses the IP addresses from the online data to map to one or more geographic regions. Examples of online data include, but are not limited to, page content, user clicks, advertisement impressions, and web pages visited.

The present system defines various geographic regions that have associated data sets indicating various characteristics about the users in each geographic region. According to one embodiment, the present system projects data sets to define a geographic region that has similar profiles for the data sets being used. The profiles may include, but are not limited to, a demographic profile, an IP address distribution, and a consumption pattern. Thus, the geographic regions may be independent of specific geography. The present system identifies a set of target geographic regions to each advertisement campaign and serves advertisement impressions to users in the set of target geographic regions. In one embodiment, the present system estimates a volume of available advertisement impressions that can be served to a plurality of advertisement placements based on the set of target geographic regions.

According to one embodiment, at the proposal stage for a campaign opportunity, an advertiser typically has a desired performance goal, or performance goals, when specifying a contract for an advertisement campaign. The advertiser may further specify constraints for the delivery of the advertisement campaign. Thus, the present system estimates the number of available advertisement impressions that can be served while following the client's delivery constraints and maintaining a specified performance level or performance levels. The specified performance level is based on various performance metrics, including, but not limited to, a click-through-rate (CTR), a cost per action (CPA), a rate of display of an advertisement to a user, and a video completion rate. Based on the estimate of available impressions, the present system performs a calculation using CPM (cost per mille) to provide a recommendation of a budget for the advertisement campaign and further determines if the advertiser's proposed budget can be met.

FIG. 1 illustrates a flowchart of an exemplary process for estimating an advertisement impression volume for an advertisement campaign, according to one embodiment. The present system identifies advertisement placements for an advertisement campaign based on campaign parameters and advertisement placements that satisfy a specified performance level for a past advertisement campaign at 101. The campaign parameters may include, but are not limited to, a creative type (e.g., a display advertisement and a video advertisement), a restriction on the primary language of the inventory and configuration restrictions. Examples of configuration restrictions include, but are not limited to, the size of an advertisement, the content of an advertisement, and the technology with which the advertisement was created). The present system selects a set of target geographic regions for the advertisement campaign based on a target audience at 102. The present system determines a total available advertisement impression volume from the identified advertisement placements for the set of target geographic regions at 103. The present system determines a discount rate that accounts for various factors at 104. For example, the discount rate may take into account the possibility that the web pages that serve an advertisement impression may not achieve the specified performance level for an advertisement campaign under consideration, and the possibility that the advertisement campaign may not win every bid request in an RTB auction. The present system estimates a discounted advertisement impression volume from the total available advertisement impression volume based on the discount rate at 105. The discounted advertisement impression volume provides an estimate of the number of available advertisement impressions that can be served while maintaining a specified performance level.

Advertisement Placement Filter: Campaign Parameters

According to one embodiment, the present system identifies advertisement placements for an advertisement campaign based on campaign parameters. The campaign parameters include, but are not limited to, a creative type, a restriction on the primary language of the inventory and configuration restrictions (which include but are not limited to the size of an advertisement, the content of an advertisement, and the technology with which the advertisement was created). In one embodiment, the present system identifies advertisement placements for an advertisement campaign based on a specified creative type. For example, an advertisement placement for a video creative may be different from another advertisement placement for a display creative.

In another embodiment, the present system identifies advertisement placements based on a specified language type. For example, the present system identifies advertisement placements based on a primary language (e.g., French). The number of identified advertisement placements that can be considered for an advertisement campaign varies based on the campaign parameters. Since impression volumes vary for each placement, the advertisement impression volume for a campaign varies because a unique plurality of advertisement placements is chosen for the campaign based on the campaign parameters.

Advertisement Placement Filter: Specified Performance Level

According to one embodiment, the present system identifies advertisement placements that satisfy a specified performance level based on past advertisement campaigns. Generally, increasing a specified performance level decreases the volume of advertisement impressions that can be served. The number of targeted users that are interested in a particular product of an advertising campaign is limited, and those users frequent certain websites, so the number of advertisement placements/web pages on which ads can be served to those users is limited. If the volume of advertisement impressions generated from these web pages (accessed by users in a target geographic region) during an advertisement campaign does not fulfill a desired volume of advertisement impressions, the present system must serve the advertisement on other web pages that do not perform as well because they have a lower concentration of interested users. Thus, if a required volume of advertisement impressions is too high, performance will most likely suffer. The present system accounts for the interaction between performance and volume by choosing relevant placements based on past performance.

According to one embodiment, the present system identifies advertisement placements based on historical performance data. The historical performance data may be based on various performance metrics, including, but not limited to a click-through-rate (CTR), a cost per action (CPA), and a video completion rate. The present system identifies advertisement placements that are most likely to provide a specified performance level for a generic advertisement campaign. From previously-run advertisement campaigns, the present system can determine which advertisement placements are most likely to contribute positively to an overall campaign performance based on a desired performance metric.

Impression Volume for Geographic Region

According to one embodiment, the present system receives a bid request to serve an advertisement impression to an advertisement placement, where the bid request is associated with a web page and a geographic region. The present system identifies a plurality of advertisement placements as described above and determines a volume of available advertisement impressions from each geographic region corresponding to the identified plurality of advertisement placements.

Discount Rate

As discussed earlier, according to one embodiment, the present system identifies a plurality of advertisement placements that satisfy campaign parameters and a specified performance level based on historical performance data. However, it is not optimum for an advertisement campaign to run on all advertisement placements. For example, some web pages may not be accessed by a target audience. Some web pages may not perform as well for a specific campaign as it did for past campaigns, so that advertisement placement that was predicted to perform at the specified level does not in reality. Thus, not every placement chosen in previous steps will turn out to be a best fit for the advertisement campaign. The present system further accounts for the possibility that the advertisement campaign may not win every bid request in an RTB auction. According to one embodiment, the present system estimates a probable volume of the advertisement placements by accounting for the possibility that not every possible advertisement impression from the plurality of selected placements will be converted into a served impressions for the campaign.

According to one embodiment, the present system determines a discount rate for each volume of advertisement impression that corresponds to a respective geographic region. The present system may determine the discount rate based on historical data such as, but is not limited to, advertisement impression volume that meets a specified performance level compared to the advertisement impression volume that is available while the campaign is run. The discount rate may also vary based on the criteria discussed above to choose the plurality of possible placements. The present system determines a discounted advertisement impression volume based on the discount rate.

Geographic Region Selection

According to one embodiment, the present system selects a set of target geographic regions that is appropriate for an advertisement campaign. Based on offline data and online data, the present system determines a set of target geographic regions that includes a target audience and a product being promoted in the advertisement campaign. The target audience may be based on various factors, including, but not limited to, a demographic profile, an IP address distribution, and a consumption pattern. The present system determines a sum of the discounted advertisement impression volume for the set of target geographic regions. In one embodiment, the present system may further verify that there is enough advertisement impression volume in the set of target geographic regions to meet the budget of a client. In another embodiment, the present system can scale the advertisement impression volume to the number of days that the advertisement campaign will run.

Figure 2:
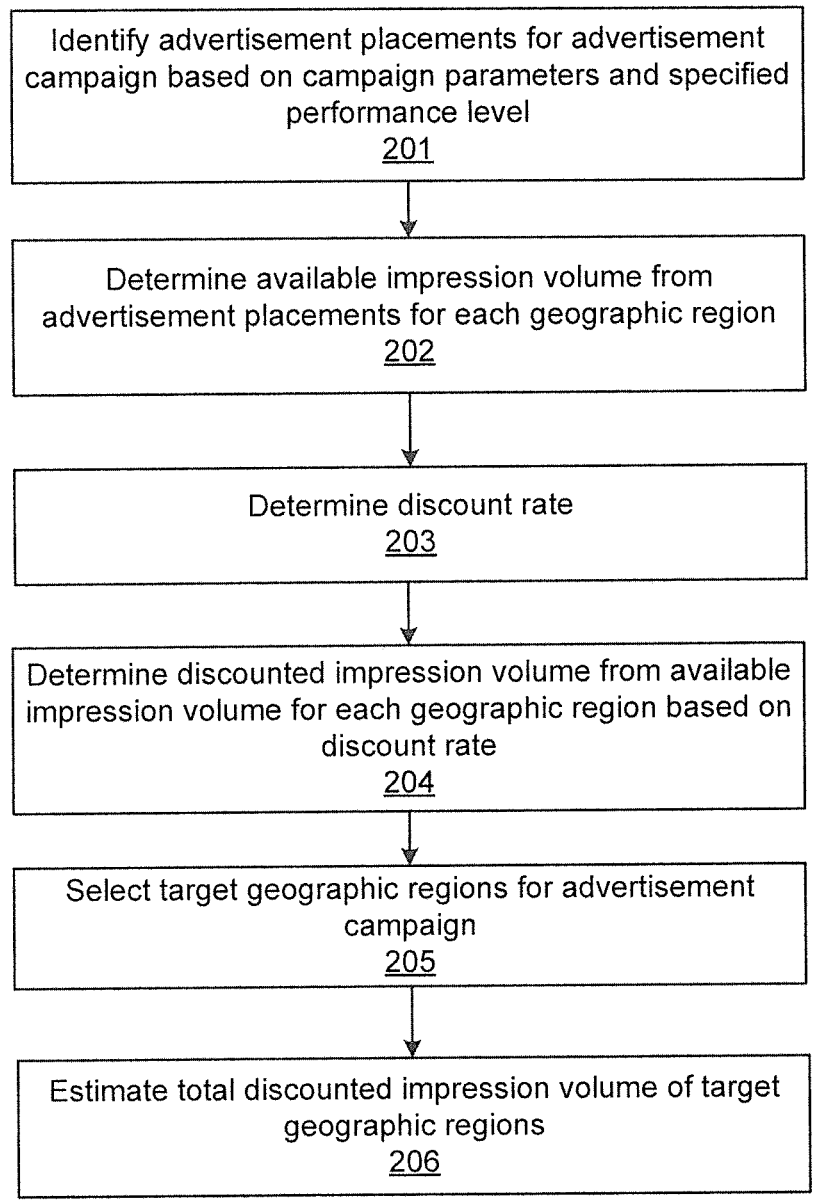
FIG. 2 illustrates a flowchart of another exemplary process for estimating an advertisement impression volume for an advertisement campaign, according to one embodiment.

FIG. 2 illustrates a flowchart of another exemplary process for estimating an advertisement impression volume for an advertisement campaign, according to one embodiment.

The present system identifies a plurality of advertisement placements that satisfy campaign parameters and a specified performance level based on historical performance data at 201. The campaign parameters include, but are not limited to, a creative type, a restriction on the primary language of the inventory and configuration restrictions. The specified performance level may be based on various performance metrics for measuring the success of an advertisement campaign, including, but not limited to a click-through-rate (CTR), a cost per action (CPA), and a video completion rate. The present system determines an available advertisement impression volume from the identified advertisement placements for each geographic region at 202. The present system determines a discount rate for each available advertisement impression volume at 203. The present system determines a discounted advertisement impression volume from the available advertisement impression volume for each geographic region based on the discount rate at 204. The present system selects a set of target geographic regions based on a target audience and a product that is being promoted for the advertisement campaign at 205. The present system estimates a sum total of discounted advertisement impression volumes for the set of target geographic regions at 206.

Figure 3:
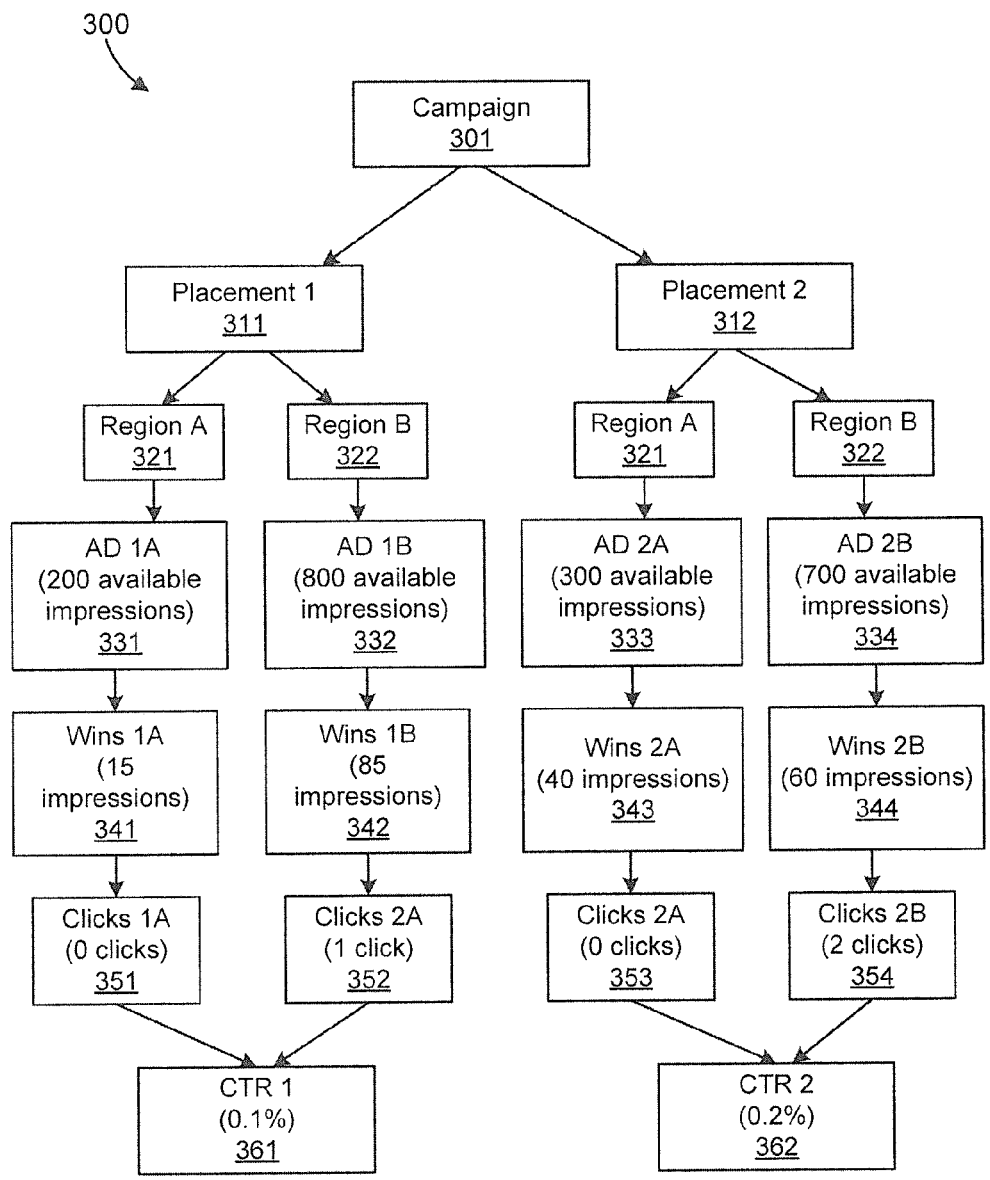
FIG. 3 illustrates a diagram of exemplary historical performance data for a past advertisement campaign, according to one embodiment.

FIG. 3 illustrates a diagram of exemplary historical performance data for a past advertisement campaign, according to one embodiment. The historical performance data 300 for a past advertisement campaign 301 includes two advertisement placements: placement 1 311 and placement 2 312. It is contemplated that any number and/or combination of performance data may be considered without deviating from the scope of the present subject matter.

The historical performance data 300 further illustrates that from advertisement placement 1 311, 200 advertisement impressions AD 1A 331 and 800 advertisement impressions AD 1B 332 are available to two respective geographic regions, region A 321 and region B 322. According to one embodiment, the present system receives bid requests to serve advertisement impressions AD 1A 331 and AD 1B 332 on placement 1 311. In this case, the present system wins 15 advertisement impressions, as indicated by wins 1A 341. The present system further wins 85 advertisement impressions, as indicated by wins 1B 342. Thus, the present system has won 100 total impressions (wins 1A 341 added to wins 1B 342) for placement 1 311 in region A 321 and region B 322. The present system recorded 1 click between both regions (i.e., clicks 1A 351 added to clicks 1B 352), so the CTR (Click-Through-Rate) for placement 1 311 is 0.1% as indicated by CTR 1 361. CTR is a calculation based on a sum total of clicks (i.e., clicks 1A 351 added to clicks 1B 352) on the advertisement relative to a sum total of advertisement impressions that have been served (i.e., wins 1A 341 added to wins 1B 342).

The historical performance data 300 further illustrates that from placement 2 312, 300 advertisement impressions AD 2A 333 and 700 advertisement impressions AD 2B 334 are available to two respective geographic regions, region A 321 and region B 322. According to one embodiment, the present system receives bid requests to serve advertisement impressions AD 2A 333 and AD 2B 334 on placement 2 312. In this case, the present system wins 40 advertisement impressions, as indicated by wins 2A 343. The present system further wins 60 advertisement impressions, as indicated by wins 2B 344. Thus, the present system determines a 0.2% CTR, as indicated by CTR 2 362 for placement 2 312 based on a sum total of clicks (i.e., clicks 2A 353 and clicks 2B 354) on the advertisement relative to a sum total of advertisement impressions that have been served (i.e., AD 2A 353 and AD 2B 354).

According to be one embodiment, based on the historical performance data 300 as illustrated in FIG. 3, the present system may specify a performance level for a campaign opportunity to be at least 0.2% CTR and a target geographic region to be region A 321. Based on the specified performance level, the present system identifies placement 2 312 that provides a 0.2% CTR, as indicated by CTR 2 362. The present system further determines 300 available advertisement impressions (AD 2A 333) that can be served to placement 2 312 based on the target geographic region, i.e., region A 321.

According to one embodiment, the present system determines a discount rate based on various factors. For example, a web page that is visited by users of a target geographic region may not provide the specified performance level. (e.g., the CTR is 0% for placement 2 312 for region A 321 since there are 0 clicks (clicks 2A 353)). In another example, the present system may not win every advertisement impression it bids on in an RTB auction because the number of advertisement impressions won versus the number of advertisement impressions available varies over time.

According to one embodiment, the present system considers the discount rate as a tuning parameter. In one embodiment, the discount rate may be a particular equation involving historical data as shown in FIG. 3. One example of a discount rate equation is as follows:

$$\text{Discount Rate} = \frac{(\text{Average win rate})}{\text{Average number of campaigns for a target geographic region}}$$

where an average win rate is a number of impressions won per number of bids placed based on historical data from an advertisement type (e.g., a win rate for a display advertisement type may be different from a win rate for a video advertisement type). The average number of advertisement campaigns for a target geographic region is important, because more campaigns may be run in New York City, for example, rather than Spokane, Wash. According to one embodiment, a discounted impression volume is predicted based on multiplying the discount rate equation by an available impression volume for a target geographic region.

In other embodiments, the discount rate may not follow a specific equation and rather is deduced from other historical data components within the present system, which can include but are not limited to a comparison between a request volume present for a target geographic area and an actual number of impressions that was served and maintained a desired performance for an advertisement campaign in the target geographic area.

Figure 4:
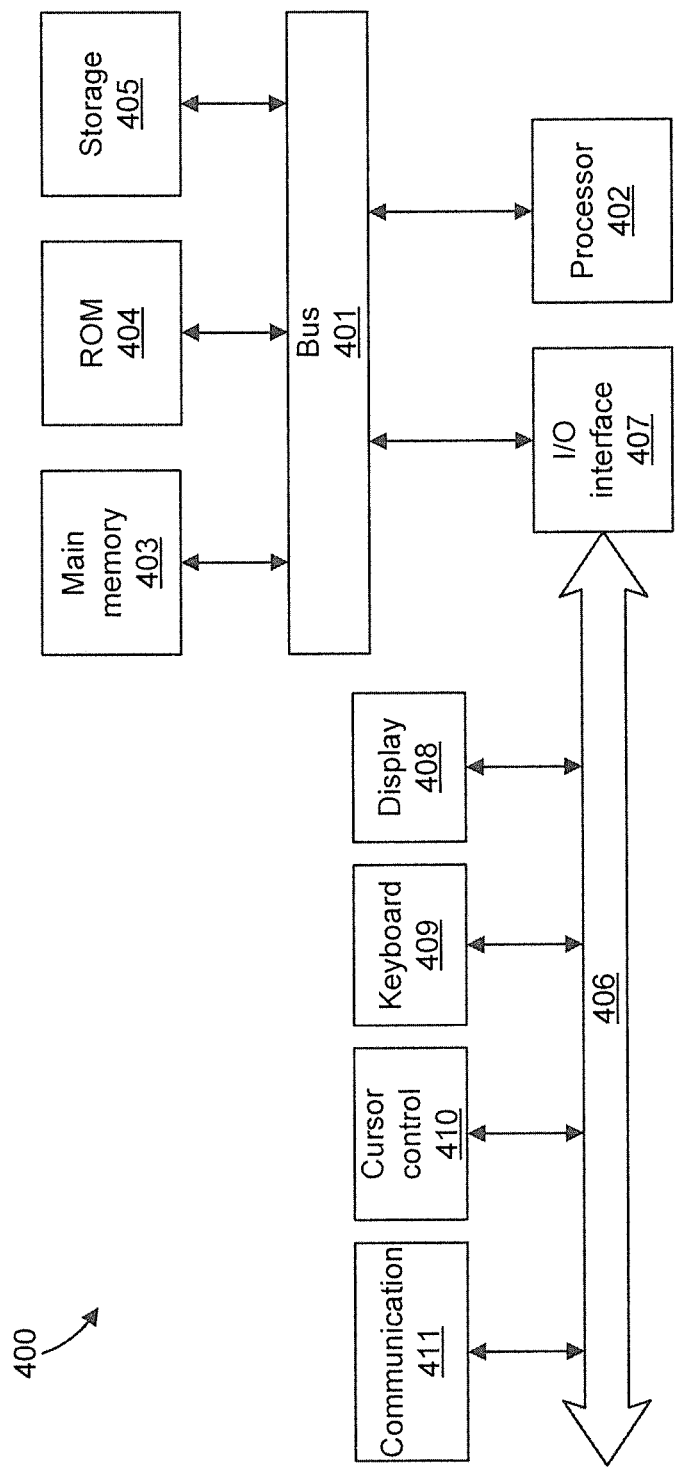
FIG. 4 illustrates an exemplary computer architecture that may be used for the present system, according to one embodiment.

FIG. 4 illustrates an exemplary computer architecture that may be used for the present system, according to one embodiment. The exemplary computer architecture may be used for implementing one or more components described in the present disclosure including, but not limited to, the present system. One embodiment of architecture 400 includes a system bus 401 for communicating information, and a processor 402 coupled to bus 401 for processing information. Architecture 400 further includes a random access memory (RAM) or other dynamic storage device 403 (referred to herein as main memory), coupled to bus 401 for storing information and instructions to be executed by processor 402. Main memory 403 also may be used for storing temporary variables or other intermediate information during execution of instructions by processor 402. Architecture 400 may also include a read only memory (ROM) and/or other static storage device 404 coupled to bus 401 for storing static information and instructions used by processor 402.

A data storage device 405 such as a magnetic disk or optical disc and its corresponding drive may also be coupled to architecture 400 for storing information and instructions. Architecture 400 can also be coupled to a second I/O bus 406 via an I/O interface 407. A plurality of I/O devices may be coupled to I/O bus 406, including a display device 408, an input device (e.g., an alphanumeric input device 409 and/or a cursor control device 410).

The communication device 411 allows for access to other computers (e.g., servers or clients) via a network. The communication device 411 may include one or more modems, network interface cards, wireless network interfaces or other interface devices, such as those used for coupling to Ethernet, token ring, or other types of networks.

The above example embodiments have been described hereinabove to illustrate various embodiments of implementing a system and method for estimating an advertisement impression volume. Various modifications and departures from the disclosed example embodiments will occur to those having ordinary skill in the art. The subject matter that is intended to be within the scope of the invention is set forth in the following claims.

We claim:

1. A computer-implemented method for evaluating and controlling a particular real-time online bidding campaign in an automated real-time online auction system, the method comprising:

for at least one reference bidding campaign:
receiving a plurality of bid requests at a real-time bidding system from one or more real-time bidding exchanges via a network, each bid request (a) identifying a placement in digital content being loaded or rendered by a respective internet-connected device and (b) including identification information associated with the respective internet-connected device, wherein each placement comprises a defined component within respective digital content, the placement being configured for selectively displaying any of a plurality of different ad creatives for any of a plurality of different bidding campaigns;

for at least some of the received plurality of bid requests, the real-time bidding system submitting a bid for the placement identified in the respective bid request;

for at least some submitted bids, the real-time bidding system receiving bid result information indicating whether the submitted bid was a winning bid, wherein for each winning bid an impression, comprising an instance of an ad creative, is delivered to the respective internet-connected device via the respective placement identified in the respective bid request;

for at least some winning bids, the real-time bidding system receiving target action data indicating performance of a target user action associated with the respective impression delivered via the respective placement;

calculating, by the bidding system, a performance metric for each of a plurality of placements based on received bid requests that identify the respective placement, submitted bids for such bid requests, bid result information for such submitted bids, and the received target action data associated with the respective placement;

selecting, by the bidding system, from the plurality of placements, one or more target placements for the particular real-time online bidding campaign based on the calculated performance metrics for the plurality of placements;

selecting, by the bidding system, from a plurality of geographic regions, one or more target geographic regions for the particular real-time online bidding campaign;

for each target placement, calculating, by the bidding system, an available impression volume for each target geographic region;

for each calculated available impression volume:
determining, by the bidding system, a discount rate as a function of an average win rate indicating a number of impressions won per number of bids placed by the bidding system, based on historical bid result information for bids submitted by the bidding system; and
calculating a discounted available impression volume by applying the determined discount rate to the available impression volume;

calculating, by the bidding system, a total available impression volume for the particular real-time online bidding campaign by summing the plurality of discounted available impression volumes; and automatically controlling, by the bidding system, at least one operational aspect of the particular real-time online bidding campaign based on the calculated total available impression volume.

2. The computer-implemented method of claim 1, comprising selecting the one or more target placements from the plurality of placements based on the calculated performance metrics for the plurality of placements and based on a comparison of each placement to a campaign parameter, wherein the campaign parameter comprises one or more of a creative type, a language, and a configuration.

3. The computer-implemented method of claim 1, wherein the performance metric comprises one or more of a click-through rate, a cost per action, a rate of display of an advertisement, or a video completion rate.

4. The computer-implemented method of claim 1, comprising selecting the one or more target geographic regions based on offline data and online data.

5. The computer-implemented method of claim 4, wherein the offline data comprises one or more of demographic data, point of sale data, and business information data.

6. The computer-implemented method of claim 4, wherein the online data comprises one or more of page content, user clicks, advertisement impressions, and web pages visited.

7. The computer-implemented method of claim 1, comprising selecting the one or more target geographic regions based on one or more of a target audience, or a product being promoted in the particular real-time online bidding campaign.

8. The computer-implemented method of claim 1, wherein the discount rate for each calculated available impression volume is based on a number of advertisement impressions that is required to satisfy a specified performance level for the a respective reference bidding campaign relative to a total number of advertisement impressions for the respective reference bidding campaign.

9. A non-transitory computer readable medium containing computer-readable instructions for evaluating and controlling a particular real-time online bidding campaign in an automated real-time online auction system, wherein the computer-readable instructions are executable by a computer processor to perform operations comprising:

for at least one reference bidding campaign:

receiving a plurality of bid requests from one or more real-time bidding exchanges via a network, each bid request (a) identifying a placement in digital content being loaded or rendered by a respective internet-connected device and (b) including identification information associated with the respective internet-connected device, wherein each placement comprises a defined component within respective digital content, the placement being configured for selectively displaying any of a plurality of different ad creatives for any of a plurality of different bidding campaigns;

for at least some of the received plurality of bid requests, submitting a bid for the placement identified in the respective bid request;

for at least some submitted bids, receiving bid result information indicating whether the submitted bid was a winning bid, wherein for each winning bid an impression, comprising an instance of an ad creative, is delivered to the respective internet-connected device via the respective placement identified in the respective bid request;

for at least some winning bids, receiving target action data indicating performance of a target user action associated with the respective impression delivered via the respective placement;

storing bid request volume data indicating respective volumes of bid requests associated with a plurality of different placements and a plurality of different geographic regions;

calculating a performance metric for each of the plurality of placements based on received bid requests that identify the respective placement, submitted bids for such bid requests, bid result information for such submitted bids, and the received target action data associated with the respective placement;

selecting, from the plurality of placements, one or more target placements for the particular real-time online bidding campaign based on the calculated performance metrics for the plurality of placements;

selecting, from a plurality of geographic regions, one or more target geographic regions for the particular real-time online bidding campaign;

for each target placement, calculating an available impression volume for each target geographic region;

for each calculated available impression volume:

determining, by the bidding system, a discount rate as a function of an average win rate indicating a number of impressions won per number of bids placed by the bidding system, based on historical bid result information for bids submitted by the bidding system; and calculating a discounted available impression volume by applying the determined discount rate to the available impression volume;

calculating a total available impression volume for the particular real-time online bidding campaign by summing the plurality of discounted available impression volumes; and automatically controlling at least one operational aspect of the particular real-time online bidding campaign based on the calculated total available impression volume.

10. The non-transitory computer readable medium of claim 9, wherein the computer-readable instructions are executable by the computer processor to select the one or more target placements from the plurality of placements based on the calculated performance metrics for the plurality of placements and based on a comparison of each placement to a campaign parameter, wherein the campaign parameter comprises one or more of a creative type, a language, and a configuration.

11. The non-transitory computer readable medium of claim 9, wherein the performance metric comprises one or more of a click-through rate, a cost per action, a rate of display of an advertisement, or a video completion rate.

12. The non-transitory computer readable medium of claim 9, wherein the computer processor performs the operations to select the one or more target geographic regions based on offline data and online data.

13. The non-transitory computer readable medium of claim 12, wherein the offline data comprises one or more of demographic data, point of sale data, and business information data.

14. The non-transitory computer readable medium of claim 12, wherein the online data comprises one or more of page content, user clicks, advertisement impressions, and web pages visited.

15. The non-transitory computer readable medium of claim 9, wherein the computer processor performs the operations to select the one or more target geographic regions based on one or more of a target audience, or a product being promoted in the particular real-time online bidding campaign.

16. The non-transitory computer readable medium of claim 9, wherein the discount rate for each calculated available impression volume is based on a number of advertisement impressions that is required to satisfy a specified performance level for the a respective reference bidding campaign relative to a total number of advertisement impressions for the respective reference bidding campaign.

* * * * *